United States Patent
Henning et al.

(10) Patent No.: US 6,984,687 B2
(45) Date of Patent: Jan. 10, 2006

(54) OIL EXTENDED RUBBER AND COMPOSITION CONTAINING LOW PCA OIL

(75) Inventors: Steven Kristofer Henning, Hudson, OH (US); Edward Lee Johnson, Richfield, OH (US); Michael Lester Kerns, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 52 days.

(21) Appl. No.: 10/760,789

(22) Filed: Jan. 19, 2004

(65) Prior Publication Data

US 2005/0159513 A1 Jul. 21, 2005

(51) Int. Cl.
*C08L 5/01* (2006.01)
(52) U.S. Cl. .............. 524/474; 524/490; 524/491; 524/571; 524/575
(58) Field of Classification Search ........... 524/474, 524/490, 491, 571, 575
See application file for complete search history.

(56) References Cited

U.S. PATENT DOCUMENTS

| | | | |
|---|---|---|---|
| 5,260,370 A | 11/1993 | Kang et al. | 524/575 |
| 6,103,842 A | 8/2000 | Halasa et al. | 526/175 |
| 6,559,240 B2 | 5/2003 | Hsu et al. | 525/332.8 |
| 6,602,942 B1 * | 8/2003 | Karato | 524/474 |
| 2002/0045697 A1 | 4/2002 | Sohnen et al. | 524/492 |
| 2002/0198296 A1 | 12/2002 | Rawlinson et al. | 524/173 |

* cited by examiner

*Primary Examiner*—Robert D. Harlan
(74) *Attorney, Agent, or Firm*—John D. DeLong, Esq.

(57) ABSTRACT

The invention is directed to an oil extended rubber and composition comprising: a solution-polymerized elastomer derived from at least one conjugated diene monomer and at least one vinyl aromatic monomer, the elastomer coupled with at least one metal selected from the group consisting of silicon and tin; and from about 5 to about 70 parts by weight, per 100 parts by weight of elastomer (phr), of a process oil having a glass transition temperature of from about $-80°$ C. to about $-40°$ C., a polycyclic aromatic content of less than 3 percent by weight as determined by the IP346 method, and an aromatic content of less than 20 percent by weight as measured by ASTM D2140.

19 Claims, No Drawings

OIL EXTENDED RUBBER AND COMPOSITION CONTAINING LOW PCA OIL

BACKGROUND OF THE INVENTION

In rubber and rubber compositions for use in pneumatic tires, it is common to utilize processing oils to soften and extend the rubber. Typically, aromatic processing oils having a certain content of polycyclic aromatic (PCA) compounds or polyaromatic hydrocarbons (PAH) have been used. Recently, regulatory concerns have necessitated the use of processing oils having a lower PCA content.

Certain types of rubber, or rubbery polymers, are difficult to oil extend due to degradation of the polymer chains. For example, silica or tin coupled styrene-butadiene rubbers are not typically extended with conventional highly aromatic DAE oils because the oil renders the polymer unstable and significant Mooney viscosity loss is seen.

Metal coupled styrene-butadiene polymers are especially useful in tire compounds. Coupled SBR may be synthesized at high molecular weights, offering the advantage of low hysteresis compounds. However, use of these rubbers has heretofore been limited due to the problems in extending the rubbers with conventional highly aromatic oils. It would, therefore, be advantageous to be able to oil extend these types of rubbers without experiencing the level of degradation seen with aromatic oils.

SUMMARY OF THE INVENTION

The invention is directed to an oil extended rubber and composition comprising: a solution-polymerized elastomer derived from at least one conjugated diene monomer and at least one vinyl aromatic monomer, the elastomer coupled with at least one metal selected from the group consisting of silicon and tin; and from about 5 to about 70 parts by weight, per 100 parts by weight of elastomer (phr), of a process oil having a glass transition temperature of from about −80° C. to about −40° C., a polycyclic aromatic content of less than 3 percent by weight as determined by the IP346 method, and an aromatic content of less than 20 percent by weight as measured by ASTM D2140.

DESCRIPTION OF THE INVENTION

There is disclosed an oil extended rubber and composition comprising a solution-polymerized elastomer derived from at least one conjugated diene monomer and at least one vinyl aromatic monomer, the elastomer coupled with at least one metal selected from the group consisting of silicon and tin; and from about 5 to about 70 parts by weight, per 100 parts by weight of elastomer (phr), of a process oil having a glass transition temperature of from about −80° C. to about −40° C., a polycyclic aromatic content of less than 3 percent by weight as determined by the IP346 method, and an aromatic content of less than 20 percent by weight as measured by ASTM D2140

The oil extended rubber of the present invention comprises at least one elastomer. In one embodiment, the oil extended rubber includes a solution-polymerized silicon- or tin-coupled elastomer derived from at least one conjugated diene monomer and at least one vinyl aromatic monomer. In another embodiment, the oil extended rubber includes solution-polymerized tin- or silicon-coupled styrene-butadiene rubber (SBR).

The polymerizations employed in making the rubbery polymers are typically initiated by adding an organolithium initiator to an organic polymerization medium that contains the monomers. Such polymerizations are typically carried out utilizing continuous polymerization techniques. In such continuous polymerizations, monomers and initiator are continuously added to the organic polymerization medium with the rubbery polymer synthesized being continuously withdrawn. Such continuous polymerizations are typically conducted in a multiple reactor system.

Suitable polymerization methods are known in the art, for example as disclosed in U.S. Pat. Nos. 4,843,120; 5,137, 998; 5,047,483; 5,272,220; 5,239,009; 5,061,765; 5,405, 927; 5,654,384; 5,620,939; 5,627,237; 5,677,402; 6,103, 842; and 6,559,240; all of which are fully incorporated herein by reference.

The rubbery polymers usable in accordance with this invention can be made by the random copolymerization of at least one conjugated diolefin monomer with at least one vinyl aromatic monomer. It is, of course, also possible to make living rubbery polymers by polymerizing a mixture of conjugated diolefin monomers with one or more ethylenically unsaturated monomers, such as vinyl aromatic monomers. The conjugated diolefin monomers which can be utilized in the synthesis of rubbery polymers generally contain from 4 to 12 carbon atoms. Those containing from 4 to 8 carbon atoms are generally preferred for commercial purposes. For similar reasons, 1,3-butadiene is the most commonly utilized conjugated diolefin monomer. Some additional conjugated diolefin monomers that can be utilized include 2,3-dimethyl-1,3-butadiene, piperylene, 3-butyl-1, 3-octadiene, 2-phenyl-1,3-butadiene, and the like, alone or in admixture.

Some representative examples of ethylenically unsaturated monomers that can potentially be synthesized into rubbery polymers usable in accordance with this invention include vinyl aromatics such as styrene, α-methylstyrene, bromostyrene, chlorostyrene, fluorostyrene and the like, alone or in admixture.

Rubbery polymers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in many applications.

Vinyl aromatic monomers are probably the most important group of ethylenically unsaturated monomers which are commonly incorporated into polydienes. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene.

Some representative examples of rubbery polymers usable in accordance with this invention include styrene-butadiene rubbers. In cases where the rubbery polymer is comprised of repeat units that are derived from two or more monomers, the repeat units which are derived from the different monomers will normally be distributed in an essentially random manner.

The amount of organolithium initiator utilized will vary with the monomers being polymerized and with the molecular weight that is desired for the polymer being synthesized. However, as a general rule, from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The polymerization temperature utilized can vary over a broad range of from about −20° C. to about 180° C. In most cases, a polymerization temperature within the range of about 30° C. to about 125° C. will be utilized. It is typically preferred for the polymerization temperature to be within the range of about 45° C. to about 100° C. It is typically most preferred for the polymerization temperature to be within the range of about 60° C. to about 85° C. The pressure used will normally be sufficient to maintain a substantially liquid phase under the conditions of the polymerization reaction.

The rubber polymers which are prepared by anionic polymerization are coupled with a suitable coupling agent, such as a tin halide or a silicon halide, to improve desired properties. Tin-coupled polymers are known to improve treadwear and to reduce rolling resistance when used in tire tread rubbers. Such tin-coupled rubbery polymers are typically made by coupling the rubbery polymer with a tin coupling agent at or near the end of the polymerization used in synthesizing the rubbery polymer. In the coupling process, live polymer chain ends react with the tin coupling agent, thereby coupling the polymer. For instance, up to four live chain ends can react with tin tetrahalides, such as tin tetrachloride, thereby coupling the polymer chains together.

The coupling efficiency of the tin coupling agent is dependant on many factors, such as the quantity of live chain ends available for coupling and the quantity and type of polar modifier, if any, employed in the polymerization. For instance, tin coupling agents are generally not as effective in the presence of polar modifiers. However, polar modifiers such as tetramethylethylenediamine, are frequently used to increase the glass transition temperature of the rubber for improved properties, such as improved traction characteristics in tire tread compounds. Coupling reactions that are carried out in the presence of polar modifiers typically have a coupling efficiency of about 50–60% in batch processes.

In cases where the rubbery polymer will be used in compounds that are loaded primarily with carbon black, the coupling agent will typically be a tin halide. The tin halide will normally be a tin tetrahalide, such as tin tetrachloride, tin tetrabromide, tin tetrafluoride or tin tetraiodide. However, tin trihalides can also optionally be used. Polymers coupled with tin trihalides have a maximum of three arms. This is, of course, in contrast to polymers coupled with tin tetrahalides which have a maximum of four arms. To induce a higher level of branching, tin tetrahalides are normally preferred. As a general rule, tin tetrachloride is most preferred.

In cases where the rubbery polymer will be used in compounds that are loaded with high levels of silica, the coupling agent will typically be a silicon halide. The silicon-coupling agents that can be used will normally be silicon tetrahalides, such as silicon tetrachloride, silicon tetrabromide, silicon tetrafluoride or silicon tetraiodide. However, silicon trihalides can also optionally be used. Polymers coupled with silicon trihalides have a maximum of three arms. This is, of course, in contrast to polymers coupled with silicon tetrahalides which have a maximum of four arms. To induce a higher level of branching, silicon tetrahalides are normally preferred. As a general rule, silicon tetrachloride is most preferred of the silicon-coupling agents.

Greatly improved properties for tire rubbers, such as lower hysteresis, can be attained by coupling the rubber with both a tin halide and a silicon halide. For instance, such coupled polymers can be utilized in making tires having greatly improved rolling resistance without sacrificing other tire properties. These improved properties are due in part to better interaction and compatibility with carbon black. It is highly preferred for the polymer to be asymmetrically coupled with a tin halide and a silicon halide. Asymmetrical tin coupling also normally leads to improve the cold flow characteristics. Asymmetrical coupling in general also leads to better processability and other beneficial properties. Rubbers that are coupled with both a tin halide and a silicon halide are comprised of (1) tin atoms having at least three polydiene arms covalently bonded thereto and (2) silicon atoms having at least three polydiene arms covalently bonded thereto.

The rubber polymers used in the oil extended rubber are extended with a low PCA oil having a PCA content of less than 3 percent by weight and a total aromatic content of less than 20 percent by weight. Suitable low PCA oils include mild extraction solvates (MES) and heavy naphthenic oils; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917. Generally, suitable low PCA oils include those having a glass transition temperature Tg in a range of from about −40° C. to about −80° C. MES oils generally have a Tg in a range of from about −57° C. to about −63° C. Heavy napthenic oils generally have a Tg in a range of from about −42° C. to about −48° C.

Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

In alternate embodiments, the low PCA oils may be an MES or heavy naphthenic type having characteristics as identified in the following table. Included in the table are characteristics for treated distillate aromatic extracts (TDAE), another low PCA oil having a total aromatic content greater than 20 percent.

|  | MES | TDAE | Heavy Naphthenic |
|---|---|---|---|
| Aromatics % (ASTM D2140) | 11–17 | 25–30 | 11–17 |
| Spec. Grav. @ 15° C. [kg/l] | 0.895–0.925 | 0.930–0.960 | 0.920–0.950 |
| Visc. 40° C. (cSt) | 150–230 | 370–430 | 350–820 |
| Visc. 100° C. (cSt) | 13–17 | 16–22 | 17–33 |
| Visc. Gravity Const. | 0.825–0.865 | 0.860–0.890 | 0.840–0.870 |
| Refractive Index | 1.495–1.510 | 1.520–1.540 | 1.500–1.520 |
| Tg [° C.]/inflection | −60 ± 3 | −47 ± 3 | −45 ± 3 |
| Aniline Point [° C.] | 85–100 |  |  |
| Pour Point [° C.] | 0 max | 30 max | 0 max |
| DMSO [%, IP 346] | <2.9 | <2.9 | <2.9 |
| Flashpoint [° C.] | >220 | >240 | >240 |

In one embodiment, the low PCA oils may be an MES type that is a complex combination of hydrocarbons predominantly comprised of saturated hydrocarbons in the range of C20 to C50 obtained by (1) solvent extraction of heavy petroleum distillate; or (2) treating of heavy petroleum distillate with hydrogen in the presence of a catalyst; followed by solvent dewaxing. In one embodiment, the low PCA oil contains not more than 1 mg/kg of benzo(a)pyrene, and not more than 10 mg/kg total of the following polycyclic aromatic hydrocarbons: benzo(a)pyrene, benzo(e)pyrene, benzo(a)anthracene, benzo(b)fluoranthene, benzo(j)fluoranthene, benzo(k)fluoranthene, dibenzo(a,h)anthracene, and chrysene.

Suitable MES oils are available commercially as Catenex SNR from Shell, Prorex 15 and Flexon 683 from ExxonMobil, VivaTec 200 from BP, Plaxolene MS from TotalFinaElf, Tudalen 4160/4225 from Dahleke, MES-H from Repsol, MES from Z8, and Olio MES S201 from Agip. Suitable heavy naphthenic oils are available as Shellflex 794, Ergon Black Oil C1, Ergon Black Oil C2, Ergon H2000, Cross C2000, Cross C2400, and San Joaquin 2000L. The oils may be available as the oil alone or along an elastomer in the form of an extended elastomer, such as SLR6610MES from Dow.

In one embodiment, low PCA oil is used in an amount ranging from about 5 to about 70 phr. In another embodiment, low PCA oil is used in an amount ranging from about 10 to about 50 phr. In another embodiment, low PCA oil is used in an amount ranging from about 20 to about 40 phr.

In one embodiment, the rubber may be extended in a liquid vehicle medium. Suitable liquid vehicle media include organic solvents, emulsions, and latexes. In one embodiment, the low PCA oil is added to a cement of the rubber in an organic solvent subsequent to termination of solution polymerization, followed by removal of the solvent. Solvent removal may be accomplished using one or more of the methods as are known in the art, including but not limited to precipitation, steam stripping, filtration, centrifugation, drying and the like.

The oil extended rubber may be in the form of a master batch, including such additives as carbon black and antidegradants, as is common in the art.

The oil extended rubber may be compounded into a vulcanizable rubber composition including other general purpose elastomers as are known in the art. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "vulcanizable rubber composition", "rubber composition", "compounded rubber" and "rubber compound" are used interchangeably to refer to rubber which has been blended or mixed with various ingredients and materials, and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers, such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis 1,4-polybutadiene), polyisoprene (including cis-1,4-polyisoprene), butyl rubber, halobutyl rubber such as chlorobutyl rubber or bromobutyl rubber, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include a carboxylated rubber, silicon-coupled and tin-coupled star-branched polymers. The preferred rubber or elastomers are polybutadiene, SBR, and natural rubber.

In one aspect the additional rubber to be included in the vulcanizable rubber composition is preferably one or more diene-based rubbers. For example, one or more rubbers is preferred, such as cis 1,4-polyisoprene rubber (natural rubber), styrene/butadiene rubbers, and cis 1,4-polybutadiene rubbers.

In one embodiment, the vulcanizable rubber composition may include from about 10 to about 100 phr of a solution polymerized rubbery polymer selected from polymers derived from isoprene and optionally one or more of styrene and butadiene, and tin or silicon coupled polymers derived from one or more of isoprene, styrene, and butadiene, and from about 0 to about 90 phr of at least one additional elastomer.

The vulcanizable rubber composition may include from about 10 to about 100 phr of silica.

The commonly employed siliceous pigments which may be used in the vulcanizable rubber composition include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

The vulcanizable rubber composition may include from about 10 to about 100 phr of carbon black Commonly employed carbon blacks can be used as a conventional filler. Representative examples of such carbon blacks include N110, N121, N220, N231, N234, N242, N293, N299, S315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

The vulcanizable rubber composition may include both silica and carbon black in a combined concentration of from about 20 to about 100 phr, in any weight ratio of silica to carbon black.

Other fillers may be used in the vulcanizable rubber composition including, but not limited to, particulate fillers including ultra high molecular weight polyethylene (UHM-WPE); particulate polymer gels such as those disclosed in U.S. Pat. Nos. 6,242,534; 6,207,757; 6,133,364; 6,372,857; 5,395,891; or 6,127,488, and plasticized starch composite filler such as that disclosed in U.S. Pat. No. 5,672,639. One or more other fillers may be used in an amount ranging from about 1 to about 20 phr.

It may be preferred to have the vulcanizable rubber composition to additionally contain a conventional sulfur-containing organosilicon compound. Examples of suitable sulfur-containing organosilicon compounds are of the formula:

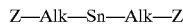

in which Z is selected from the group consisting of

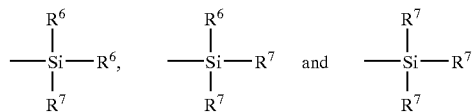

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur-containing organosilicon compounds which may be used in accordance with the present invention include: 3,3'-bis(trimethoxysilylpropyl) disulfide, 3,3'-bis(triethoxysilylpropyl)disulfide, 3,3'-bis(triethoxysilylpropyl)tetrasulfide, 3,3'-bis(triethoxysilylpropyl) octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis (methoxy diethoxy silyl ethyl)tetrasulfide, 2,2'-bis(tripropoxysilylethyl)pentasulfide, 3,3'-bis(tricyclonexoxy- silylpropyl)tetrasulfide, 3,3'-bis(tricyclopentoxysilylpropyl) trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis (dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl) trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis (propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis (trimethoxysilyloctadecyl)tetrasulfide, 18,18'-bis(tripropoxysilyloctadecenyl)tetrasulfide, 4,4'-bis(trimethoxysilylbuten-2-yl)tetrasulfide, 4,4'-bis(trimethoxysilylcyclohexylene)tetrasulfide, 5,5'-bis(dimethoxymethylsilylpentyl) trisulfide, 3,3'-bis(trimethoxysilyl-2-methylpropyl)tetrasulfide, 3,3'-bis(dimethoxyphenylsilyl-2-methylpropyl)disulfide.

The preferred sulfur-containing organosilicon compounds are the 3,3'-bis(trimethoxy or triethoxy silylpropyl)sulfides. The most preferred compounds are 3,3'-bis(triethoxysilylpropyl)disulfide and 3,3'-bis(triethoxysilylpropyl)tetrasulfide. Therefore, as to formula I, preferably Z is

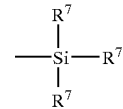

where $R^7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur-containing organosilicon compound of formula I in the vulcanizable rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the vulcanizable rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, resins including tackifying resins and plasticizers, process oils, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Process oils may be added during compounding in the vulcanizable rubber composition in addition to the extending oil in the oil extended rubber to make up to about 5 to 70 phr of total oil; these oils may include aromatic, paraffinic, napthenic, and low PCA oils such as MEW, TDAE, and heavy napthenic, although low PCA oils are preferred. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the vulcanizable rubber composition can be accomplished by methods known to those having skill in the rubber mixing art. For example, the ingredients are typically mixed in at least two stages, namely at least one non-productive stage followed by a productive mix stage. The final curatives, including sulfur-vulcanizing agents, are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The vulcanizable rubber composition may be incorporated in a variety of rubber components of the tire. For example, the rubber component may be a tread (including tread cap and tread base), sidewall, apex, chafer, sidewall insert, wirecoat or innerliner. Preferably, the compound is a tread.

The pneumatic tire of the present invention may be a race tire, passenger tire, aircraft tire, agricultural, earthmover, off-the-road, truck tire and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

COMPARATIVE EXAMPLE 1

In this comparative example, the effect of extending a non-coupled solution polymerized styrene-butadiene elastomer with low PCA oil is demonstrated.

Polymer Sample Preparation

A solution polymerized poly (styrene-co-butadiene) sample was prepared on a continuous stirred tank reactor chain. A 28/72 wt/wt comonomer mixture was prepared to 20 percent solids in hexane and dried over silica gel columns and 3 A molecular sieves. This solution was added to the first of two reactors with the primary initiator (n-butyl lithium) and a two modifiers (N,N,N',N'-tetramethylenediamine and sodium mentholate). The polymerization was allowed to go to completion and the polymer cement was taken from the second reactor, terminated with a solution of the antioxidant, Polystay 100. This SBR copolymer had a Tg of approximately −22° C.

Oil Extended Sample Preparation

The stabilized polymer cement from above was separated into three separate samples. To each a different process oil was added at 37.5 phr (27.3 wt %). The oil was allowed to mix for several hours before the oil-extended cement was steam-stripped and dried. The drying process consisted of passing the wet crumb through an open-barrel extruder followed by oven drying (12 hours at 70° C.). The degradation characteristics of the dried samples are outlined below in Table 1.

TABLE 1

Stability of SBR Copolymer as a function of Extending Oil

| Sample | Oil Type | OE ML-4 Mooney Viscosity |
|---|---|---|
| C-1 | Heavy Napthenic 1 | 55 |
| C-2 | Heavy Napthenic 2 | 56 |
| C-3 | Heavy Napthenic 3 | 57 |
| C-4 | MES | 54 |
| C-5 | Aromatic | 59 |

As is apparent from the data, oil extended, the oil extended Mooney viscosity (OE ML-4) showed little variation for non-coupled SBR extended with low PCA or aromatic oils.

EXAMPLE 2

In this example, the effect of extending a solution polymerized, tin-coupled styrene-butadiene elastomer with low PCA oil is demonstrated.

Polymer Sample Preparation 220 g of a 25 weight percent styrene in hexanes premix and 660 g of a 25 weight percent butadiene in hexanes premix was added to a 1 gallon glass bowl reactor. The comonomer ratio in the resultant solution was 30/70 (weight/weight) styrene to butadiene. To that solution, an additional charge of 587 g hexane was added, bringing the total monomer concentration in the reactor to 15 weight percent. All premix solutions were dried over a silica/3 A mole sieve bed. The monomer solution was equilibrated at 65° C. prior to initiation. To this vessel approximately 2.2 mmol of N,N,N',N'-tetramethylethyldiamine (TMEDA), and 2.2 mmol n-BuLi were added, in that order. Conversion was monitored by residual monomer analysis (Gas Chromatology). At 100% conversion, an aliquot of the living cement was taken, terminated, and analyzed for molecular weight (SEC was performed via Polymer Labs B, C, and D mixed microgel columns using tetrahydrofuran as the carrier solvent and for sample preparation; MALLS measurements were carried out using a Wyatt Technologies miniDawn light scattering detector and a Hewlett Packard 1047A refractive index detector). Added to the living cement still residing in the reactor was 0.575 mmol $SnCl_4$. After a reaction time of 0.5 hours, 2.0 mmol ethanol was added to the coupled cement. The fully terminated polymer solution was removed from the reactor under a nitrogen blanket. A sample of this parent cement was stabilized with BHT (butylated hydroxy toluene, 1.0 part per hundred monomer, phm) and dried for characterization.

Oil Extended Sample Preparation

The above terminated parent polymer cements were each divided into smaller samples for oil extension and stabilization. Four samples of approximately 333 g SBR cement containing 50 g polymer were produced. To these cements, a mixture of 0.07 phm Irganox 1502L a 0.40 phm Irganox 1076 was added as stabilizers. Subsequently, approximately 18.8 g of various oils were added to the stabilized cement solutions, as shown in Table 2. These polymer/oil composite solution was allowed to mix by shaking overnight.

Degradation Study and Results

The cement/oil composites were dried in a forced-air oven at 70° C. for 24 hours at which time a sample was taken from each for SEC analysis. These samples remained in the forced air oven at 70° C. for an additional 36 hours before final SEC analysis. The results from the SEC analysis, prior to drying and post drying and aging, is given in Tables 3 and 4. Both the relative amounts of parent (peak 2) and coupled (peak 1) peaks are shown as they change with oven aging. Also calculated is the percent coupling (peak 1 divided by total peak area) and the amount of original coupling lost with aging (shown as a percentage based on the percent coupling of the non-oil extended control sample SBR-1).

TABLE 2

Oil Extension Schedule for the SBR Samples

| Sample | Oil | Type |
| --- | --- | --- |
| SBR-1 | None | Control |
| SBR-2 | Sunoco Sundex 8125 | DAE |
| SBR-3 | Mobil Tyrex 20 | TDAE |
| SBR-4 | Shell Catenex SNR | MES |

TABLE 3

Degradation Results From SEC Analysis - 24 Hours Aging

| Sample | Peak 1 Area | Peak 2 Area | % Coupled | % of Original Lost |
| --- | --- | --- | --- | --- |
| SBR-1 | 2.10 | 1.45 | 59.2 | — |
| SBR-2 | 1.12 | 8.47 | 45.7 | 23 |
| SBR-3 | 9.61 | 9.02 | 51.6 | 13 |
| SBR-4 | 1.08 | 0.76 | 58.7 | 1 |

TABLE 4

Degradation Results From SEC Analysis - 60 Hours Aging

| Sample | Peak 1 Area | Peak 2 Area | % Coupled | % of Original Lost |
| --- | --- | --- | --- | --- |
| SBR-1 | 1.36 | 0.92 | 59.5 | — |
| SBR-2 | 0.51 | 1.14 | 31.0 | 48 |
| SBR-3 | 0.70 | 1.01 | 40.9 | 31 |
| SBR-4 | 0.81 | 0.75 | 52.1 | 13 |

As is apparent from Tables 3 and 4, oil extended tin-coupled SBR shows surprisingly and unexpectedly lower degradation when extended with MES oils, as compared with extension with conventional aromatic oil and TDAE oil. By contrast, non-coupled SBR showed no variation in degradation dependence on the type of extending oil, as seen in Comparative Example 1.

While certain representative embodiments and details have been shown for the purpose of illustrating the subject invention, it will be apparent to those skilled in this art that various changes and modifications can be made therein without departing from the scope of the subject invention.

What is claimed is:

1. An oil extended rubber comprising:
   a solution-polymerized elastomer derived from at least one conjugated diene monomer and at least one vinyl aromatic monomer, said elastomer coupled with at least one metal selected from the group consisting of silicon and tin;
   and from about 5 to about 70 parts by weight, per 100 parts by weight of elastomer (phr), of a process oil having a glass transition temperature of from about −80° C. to about −40° C., a polycyclic aromatic content of less than 3 percent by weight as determined by the IP346 method, and an aromatic content of from about 11 to about 17 percent by weight as measured by ASTM D2140.

2. The oil extended rubber of claim 1, wherein said at least one conjugated diene monomer is 1,3-butadiene, said at least one vinyl aromatic monomer is styrene, and said solution-polymerized elastomer is selected from the group consisting of tin coupled styrene-butadiene rubber, silicon coupled styrene-butadiene rubber, and styrene-butadiene rubber coupled with both silicon and tin.

3. The oil extended rubber of claim 1, wherein said at least one conjugated diene monomer is 1,3-butadiene, said at least one vinyl aromatic monomer is styrene, and said solution-polymerized elastomer is tin-coupled styrene-butadiene rubber.

4. The oil extended rubber of claim 1, wherein said at least one conjugated diene monomer is 1,3-butadiene, said at least one vinyl aromatic monomer is styrene, and said solution-polymerized elastomer is silicon-coupled styrene-butadiene rubber.

5. The oil extended rubber of claim 1, wherein said process oil is selected from the group consisting of mild extraction solvates (MES) and heavy naphthenic oils.

6. The oil extended rubber of claim 1, wherein said process oil is a mild extraction solvate (MES) having a glass transition temperature in a range of from about −57° C. to about −63°C.

7. The oil extended rubber of claim 1, wherein said process oil is a heavy naphthenic oil having a glass transition temperature in a range of from about −42° C. to about −48° C.

8. The oil extended rubber of claim 1, wherein said solution-polymerized elastomer is extended by: adding the low PCA oil to a cement of the elastomer in organic solvent subsequent to termination of polymerization; and removing the solvent.

9. The oil extended rubber of claim 1 in the form of a masterbatch comprising at least one additive selected from carbon black and antidegradants.

10. The oil extended rubber of claim 1, wherein said process oil contains not more than 1 mg/kg of benzo(a)pyrene, and not more than a total of 10 mg/kg of polycyclic aromatic compounds selected from the group consisting of benzo(a)pyrene, benzo(e)pyrene, benzo(a)anthracene, benzo(b)fluoranthene, benzo(j)fluoranthene, benzo(k)fluoranthene, dibenzo(a,h)anthracene, and chrysene.

11. The oil extended rubber of claim 1 in the form of a vulcanizable rubber composition, wherein said composition further comprises a filler selected from the group consisting of carbon black, silica, polymer gels, and plasticizer/starch composites.

12. The oil extended rubber of claim 11, wherein said composition further comprises from about 10 to about 100 phr of carbon black.

13. The oil extended rubber of claim 11, wherein said composition further comprises from about 10 to about 100 phr of precipitated silica.

14. The oil extended rubber of claim 11, wherein said composition further comprises from about 20 to about 100 phr of carbon black and silica.

15. The oil extended rubber of claim 11, wherein said composition further comprises form about 1 to about 20 phr of a starch/plasticizer composite filler.

16. The oil extended rubber of claim 11, wherein said composition further comprises at least one additional elastomer is selected from the group consisting of natural rubber, polybutadiene rubber, and styrene-butadiene rubber.

17. The oil extended rubber of claim 11, wherein composition is included as a component of a pneumatic tire.

18. The oil extend rubber of claim 17, wherein said component is selected from the group consisting of tread caps, tread bases, or sidewalls.

19. The oil extended rubber of claim 1, wherein said process oil is present in a concentration of from 20 to 40 phr.

* * * * *